United States Patent [19]
Dence

[11] 3,777,458
[45] Dec. 11, 1973

[54] AIR FILTERS
[76] Inventor: Geoffrey Roy Dence, Flat 10, 13 Chesham St., London, England
[22] Filed: June 18, 1971
[21] Appl. No.: 154,439

[30] Foreign Application Priority Data
Mar. 30, 1971 Great Britain .................... 8,144/71

[52] U.S. Cl.................... 55/287, 55/294, 55/302, 55/341, 55/377, 55/379
[51] Int. Cl............................................ B01d 46/04
[58] Field of Search...................... 55/302, 272, 273, 55/282, 283, 284, 286, 287, 288, 293, 294, 341, 374, 376, 377, 378, 379, 381, DIG. 26; 210/323, 333, 451, 457

[56] References Cited
UNITED STATES PATENTS

| | | | |
|---|---|---|---|
| 2,507,335 | 5/1950 | Donohue | 55/341 X |
| 2,583,039 | 1/1952 | Boesger | 55/341 X |
| 2,826,308 | 3/1958 | Koupal | 210/457 |
| 2,938,598 | 5/1960 | Jones et al. | 55/341 X |
| 3,356,215 | 12/1967 | Miles, Jr. | 55/302 X |
| 3,303,636 | 2/1967 | Liel | 55/294 |
| 3,550,359 | 12/1970 | Fisher et al. | 55/379 X |

FOREIGN PATENTS OR APPLICATIONS

| | | | |
|---|---|---|---|
| 545,523 | 3/1932 | Germany | 165/5 |
| 740,842 | 11/1955 | Great Britain | 55/284 |

OTHER PUBLICATIONS
French Printed Application No. 2009625, Printed 2—6–70, (3 sht. dwg., 9pp. spec.)

Primary Examiner—Dennis E. Talbert, Jr.
Attorney—Karl W. Flocks

[57] ABSTRACT

This invention relates to self cleaning air filters of the type in which the operative filter elements are periodically cleaned during the operation of the filter by reversing the flow of air through these elements; and is particularly, though not exclusively concerned with such filters of comparatively large air flow capacity. The invention provides a self cleaning air filter unit comprising an inlet chamber and an outlet chamber, a filter wall arranged to separate the inlet chamber from the outlet chamber, a plurality of filter elements arranged on the filter wall in an array of cross-wise rows over a length of the filter wall to allow air to pass from the inlet chamber to the outlet chamber through the filter elements, a gantry arranged in the outlet chamber across said array for traverse along the length of the array, a plurality of reverse air flow nozzles arranged on the gantry to register successively with the filter elements on each row of the filter elements, and means for supplying air to the nozzles to exit therefrom at such speed that in use of the filter unit the flow of air from the inlet chamber to the outlet chamber is reversed through a filter element when it is in alignment with a nozzle.

2 Claims, 6 Drawing Figures

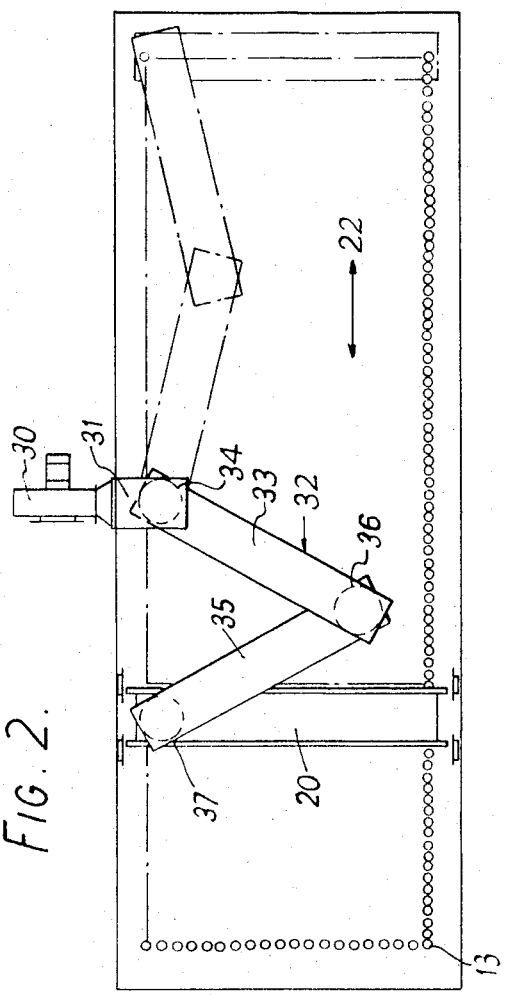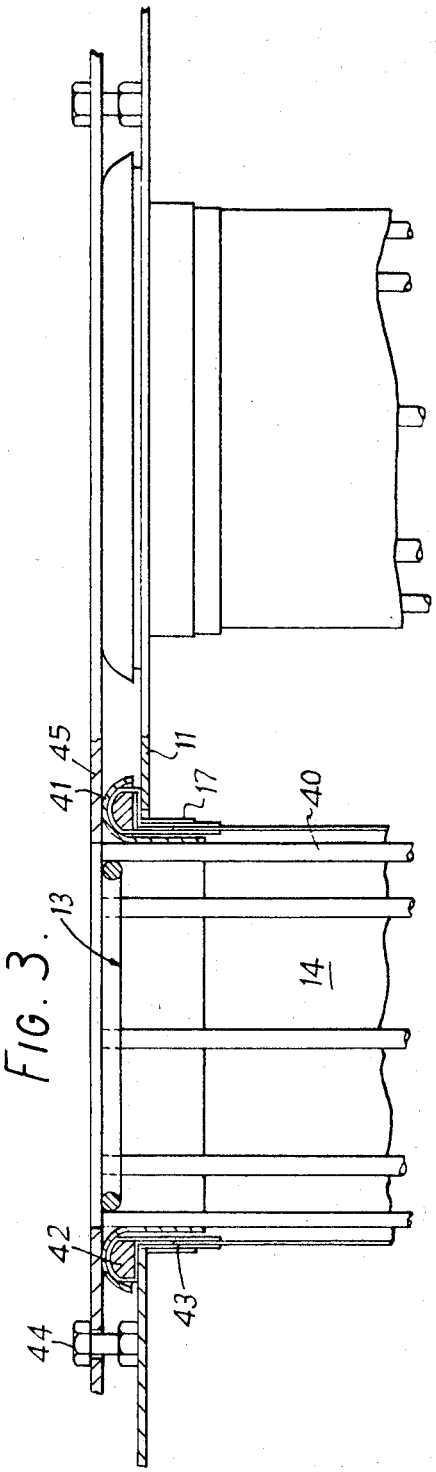
FIG. 2.
FIG. 3.

AIR FILTERS

BACKGROUND OF THE INVENTION

This invention relates to self cleaning air filters of the type in which the operative filter elements are periodically cleaned during the operation of the filter by reversing the flow of air through these elements; and is particularly, though not exclusively, concerned with such filters of comparatively large air flow capacity.

In a number of industrial processes it is necessary to filter dust and larger particulate matter from air which has circulated through a processing plant, either as a direct part of the process or by way of ventilation and air conditioning, before the air can be released again to atmosphere or recirculated. A particular, but not exclusive example of a process where the present invention finds application, is in the processing of asbestos ores. In the processes used it is necessary to remove dust and fine particles of asbestos material from large quantities of air which has been used in the process of separating the asbestos from its ore. It is desirable that the filters used are self cleaning so that the plant operation need not be interrupted while the filters are cleaned and the filtrate removed.

With previous designs of self cleaning filters, in order to handle the large quantities of air to be filtered, it has been necessary to use a large number of individual filter units because with previous designs of self cleaning filters there has been a limit to the number of and size of individual filter units which can be accommodated. This has been wasteful in space within the plant and particularly in electrical power consumption as each individual filter unit has required a separate motor to drive a fan for producing the cleaning reverse air flow through the filter elements.

It is an object of the present invention to provide an arrangement for self cleaning filters which can accommodate a large number of filter elements within a single filter unit.

SUMMARY OF THE INVENTION

Accordingly in one aspect the present invention provides a self cleaning air filter unit comprising an inlet chamber and an outlet chamber, a filter wall arranged to separate the inlet chamber from the outlet chamber, a plurality of filter elements arranged on the filter wall in an array of cross-wise rows over a length of the filter wall to allow air to pass from the inlet chamber to the outlet chamber through the filter elements, a gantry arranged in the outlet chamber across said array for traverse along the length of the array, a plurality of reverse air flow nozzles arranged on the gantry to register successively with the filter elements of each row of the filter elements, and means for supplying air to the nozzles to exit therefrom at such speed that in use of the filter unit the flow of air from the inlet chamber to the outlet chamber is reversed through a filter element when it is in alignment with a nozzle.

In a preferred arrangement of the invention the means for supplying air to said nozzles comprises an electrically driven fan unit mounted on said gantry.

In a further preferred arrangement the means for supplying air to said nozzles comprises an electrically driven fan unit mounted outside said outlet chamber and connected to said inlet port of said manifold by movable ducting.

Preferably in any of the above arrangements of the invention, the filter elements comprise filter sleeves supported against flow through them by means of open lattice cylindrical supports within them. Preferably the filter sleeves are so clamped in groups by means of plates bolted or otherwise removably attached to that surface of the filter wall.

BRIEF DESCRIPTION OF THE DRAWINGS

In order to promote a fuller understanding of the above, and other, aspects of the present invention, two embodiments will now be described, by way of example only, with reference to the accompanying drawings in which:

FIG. 2 is a plan view of the embodiment of FIG. 1,

FIG. 3 is a part cross-sectional scrap view of the mounting of the individual filter elements of FIG. 1.

DESCRIPTION OF THE PREFERRED EMBODIMENT

Figure 1:
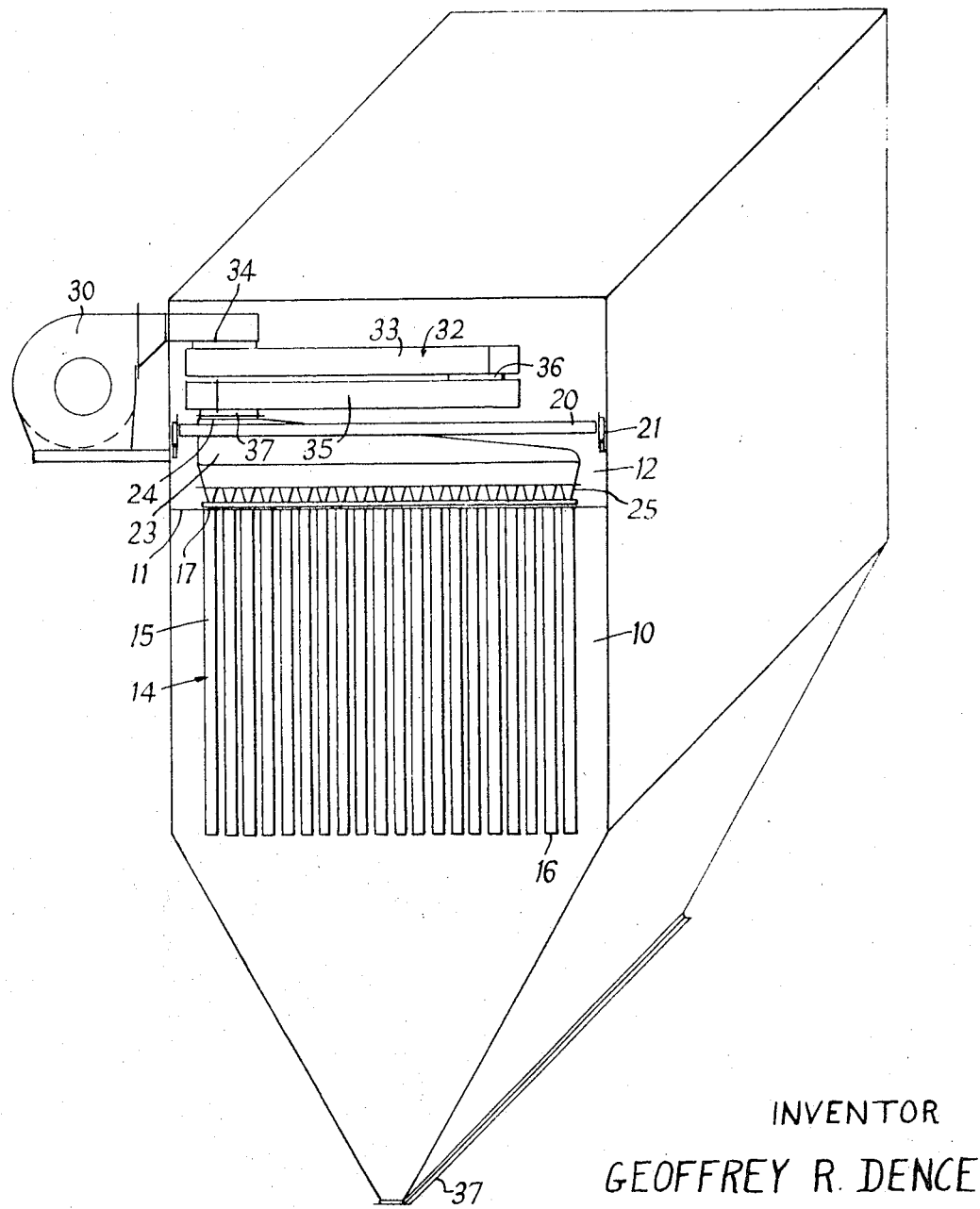
FIG. 1 is a schematic cross-sectional perspective view of a first embodiment.

Referring first to FIGS. 1 and 2, there is shown a high capacity filter for filtering process air. The filter comprises a lower chamber 10 into which air to be filtered is conveyed by means of ducting (not shown) and which is separated, by means of a filter wall 11, from an upper chamber 12 out of which filtered air is conveyed by means of ducting (not shown). The filter wall 11 extends over the whole interface between the chambers 10 and 12 and is formed with an array of cross-wise rows of apertures 13 in each of which is supported an air filter element 14. The filter elements 14 include a sleeve 15 of filter material, the lower end 16 of the sleeve 15 being closed, and the upper end 17 being sealed to the filter wall 11 around the aperture 13. Thus any air passing from the chamber 10 to the chamber 12 must pass through one of the filter sleeves 15, thus being filtered.

A gantry generally indicated at 20 is provided in the chamber 12 above the filter wall 11 and arranged to extend across the width of the array of filter elements and traverse along rails 21 over the length of the array of filter elements in the direction of the arrows 22 shown in FIG. 2. A re-circulating chain mechanism (not shown) driven by an electric motor is provided to traverse the gantry along the rails 21, the motor preferably being mounted outside the chamber 12.

The gantry 20 includes an air manifold 23 which distributes air from an inlet port 24 substantially equally to a plurality of air nozzles 25 provided along its lower surface. The nozzles 25 are spaced along the duct 23 in such manner that they align respectively with the filter elements 14 in a cross-wise row of the array. Movement of the gantry along its rails over the length of the filter unit thus brings the nozzles 25 successively into alignment with each cross-wise row of filter elements.

An electrically driven fan unit 30 is mounted on the casing of the filter unit outside the chamber 12 and arranged to blow air in through the wall of the chamber 12 by means of an inlet port 31, the inlet port 31 is connected to the inlet port 34 of the manifold 23 by means of jointed ducting indicated generally at 32. The jointed ducting 32 comprises a first duct 33 which is connected to the inlet port 31, by means of a swivel joint 34, a second duct 35 connected to the first duct by means of a swivel joint 36 and connected to the inlet 24 by means of a swivel joint 37. The arrangement as best seen in FIG. 2 is such that the ducts 33 and 35 allow a scope of movement of the gantry 20 to cover the whole length of the array of filter elements.

In operation, air from a process to be filtered flows into the chamber 10, through the filter elements into the chamber 12, and out to atmosphere or possibly recirculation through the process During the operation of the filter, the fan 30 is in continuous operation supplying air to the nozzles 25 which exits from those nozzles at a high velocity. The gantry 20 is traversed backwards and forwards over the length of the array of filter elements so that the air from the nozzles 25 passes down into respective ones of a cross-wise row of filter elements for a given period of time during each such traverse.

The velocity of the air leaving the nozzles 25 is such that it is sufficient to reverse the flow of air through the filter sleeves of that row which the nozzles are aligned with, thus causing the material which has collected on the outside of the respective filter sleeves 16 in the course of their filtering action, to be blown off the outside and to fall into the bottom of the chamber 10 to gather there and subsequently be removed through a suitable shutter, indicated generally at 37, onto a conveyor.

As best seen in FIG. 3, the filter sleeves 15 are supported from the filter wall 11 and held in shape against the inward flow of air from the chamber 10 during operation of the filter by means of a cage 40, the cage 40 is constructed of wire of rod material to form an open cylindrical lattice to support the inside of the filter sleeve and is supported from the filter wall 11 by means of a shaped flange 41 attached to its upper end. The filter sleeve 15 is rolled over a shaped resilient annular former 42 and suitably reinforced as indicated at 43 to be supported by the former 42. The former 42 rests on and seals against the upper surface of the filter wall 11 and is held down firmly in such position by the flange 41 of the respective cage to retain it in that position. A clamping plate 45 is removably attached to the filter wall 11 by means of bolts 44 and is arranged to engage and retain a number of cage flanges 41 and their respective filters, typically a pattern of six adjacent filter elements. Thus by removing a plate 45 the filter elements retained by it can be readily replaced without disturbing the remainder at any time.

The design of the chamber 10 and of the ducts by which air is fed to it is arranged so that during operation of the filter the air in the chamber 10 is comparatively still thus allowing the dust and other particles removed from the filter bags to settle in the bottom of the chamber. To further enhance the removal of dust and other particles from the filter sleeves, use is made of the fact that when the nozzles 25 come into alignment with the filter sleeves, the air flow is suddenly reversed with the result that the filter sleeves snap from the position where they are urged outwards by the reversed air flow from the nozzles 25 thus imparting a shaking action to the sleeves.

The above discussed embodiment is particularly suitsble for use in filtering hot gases because the fan unit for the reverse air supply is mounted outside the filter chambers, and thus not exposed to temperatures of the hot gas being filtered, leaving only the ducting and nozzle gantry inside the chamber which items may be more readily constructed to resist the temperature.

Figure 4:
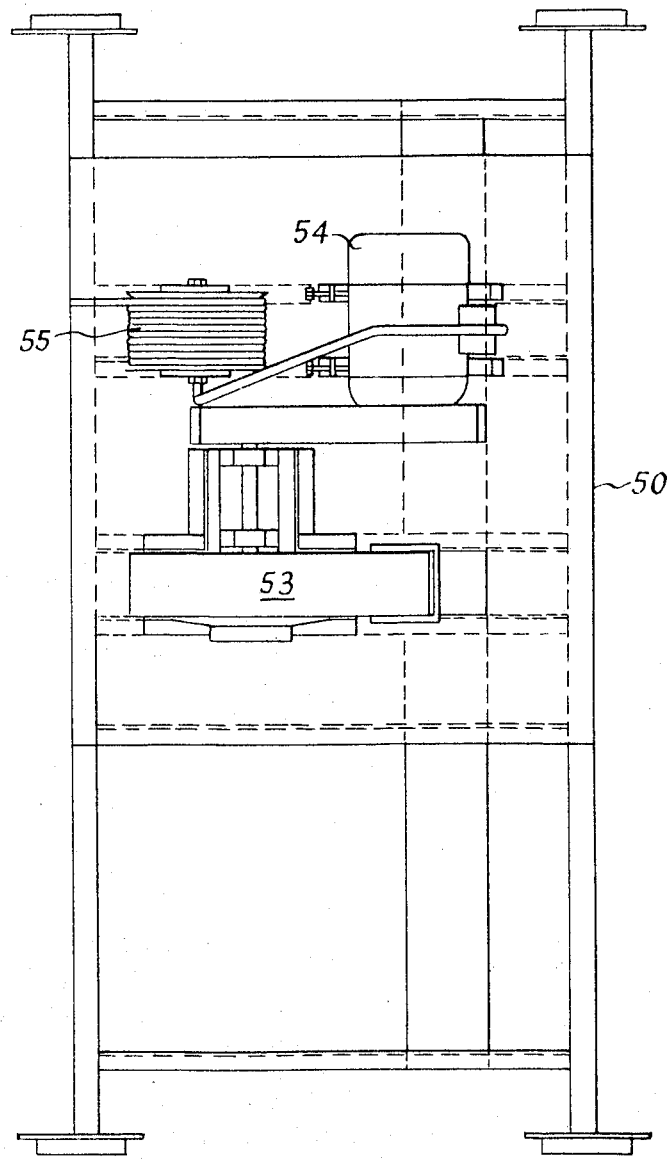
FIG. 4 is a plan view of the reverse air apparatus of a second embodiment.
Figure 5:
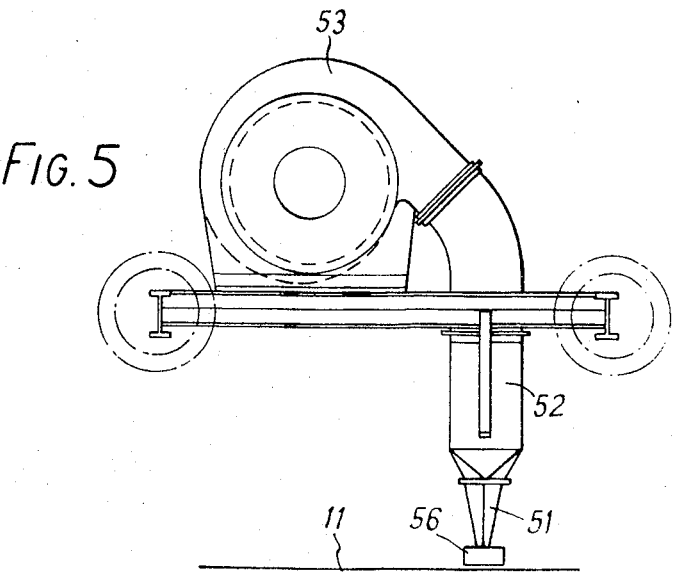
FIG. 5 is an end view of the apparatus of FIG. 4.
Figure 6:
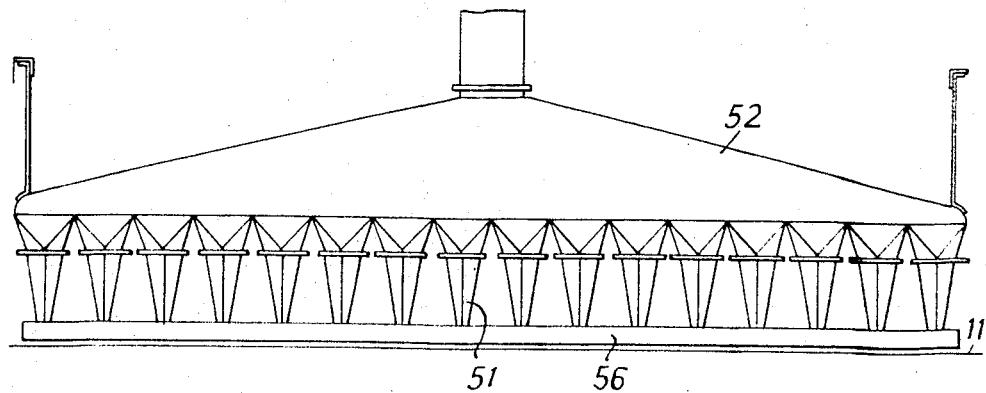
FIG. 6 is a side view of the nozzle assembly of the apparatus of FIG. 4.

FIGS. 4, 5 and 6 show an alternative embodiment which may be used where this last point is not a particular problem. In this embodiment which is otherwise similar to the previously described one, the gantry is of generally similar arrangement as indicated at 50, but carried a fan unit for the provision of reverse air flow inside the chamber 12. The gantry 50 is mounted in a similar manner for travel along a length of an array of filter elements and is similarly provided with a plurality of nozzles 51 which receive air by way of a manifold 52 from the fan unit 53. In order that an electrical supply may be carried to the motor 54 which drives the fan unit, a self coiling cable reel 55 is mounted on the gantry adjacent the motor 54 so that it will coil or uncoil a supply cable extending to one end of the filter chamber 12 as the gantry traverses.

A further feature illustrated particularly in FIGS. 5 and 6 which is applicable to either arrangement of the gantry is the provision of a flexible curtain assembly around the bottom of the reverse air flow nozzles. This flexible curtain indicated at 56 forms a shroud around all the nozzles to extend to just above the upper surface of the various clamping plates on the filter wall 11 thus to enhance the efficiency of reverse air flow by restricing the escape of air around the nozzles into the chamber 12.

Thus it can be seen that with the arrangement of the invention it is possible to provide, and arrange for the cleaning of a large number of filter elements in a self cleaning filter unit. The array of elements may be made virtually any size to suit the flow handling requirements of the filter unit, and if a particularly large unit is needed two or more gantries of reverse flow nozzles of either type may be provided in a single unit, each being arranged for the cleaning of a particular part of the array.

The embodiments of the invention to which an exclusive property or privilege is claimed are defined as follows:

1. A self cleaning air filter unit comprising an inlet chamber and an outlet chamber, a filter wall arranged in a horizontal plane to separate the inlet chamber from the outlet chamber, a plurality of filter elements arranged on the filter wall in an array of cross-wise rows over a length of the filter wall to allow air to pass from the inlet chamber to the outlet chamber through the filter elements, each said filter element comprising a filter sleeve sealed around one end to the periphery of an aperture in said filter wall and closed at the other end, and an open lattice cylindrical support cage arranged within the sleeve and mounted on said filter wall, said one end of each of said filter sleeves being provided with a resilient annular former, the material of the sleeve being rolled over the former and reinforced at that point, and said support cages being each provided with a flange, said flange being arranged to grip said former between itself and a face of said filter wall, a plurality of clamping plates each releasably attached to said filter wall and arranged to engage and retain a plurality of said support cages, a gantry arranged in the outlet chamber across said array for traverse along the length of the array, a plurality of reverse air flow nozzles arranged on the gantry to register successively with the filter elements of each row of the filter elements, a manifold having an inlet port mounted on said gantry and arranged to distribute air from the inlet port to said nozzles, the nozzles being mounted along a face of the manifold opposed to said filter wall, a flexible curtain arranged on the gantry around the outlets of all said nozzles to form a shroud therearound, the curtain extending substantially to said filter wall, and means for supplying air to the nozzles to exit therefrom at such speed that in use of the filter unit the flow of air from the inlet chamber to the outlet chamber is reversed through a filter element when it is in alignment with a nozzle, said air supply means comprising an electrically driven fan unit mounted outside said outlet chamber and movable ducting connecting said inlet port of the manifold to said fan unit.

2. A self cleaning air filter unit according to claim 1, wherein said movable ducting comprises a first duct, a port in a wall of said outlet chamber, said first duct being connected to said port by means of a first swivel joint, a second duct and a second swivel joint arranged between the first and second ducts, and a third swivel joint arranged between the second duct and said inlet port of said manifold.

* * * * *